United States Patent [19]

Petitimbert

[11] Patent Number: 4,833,583
[45] Date of Patent: May 23, 1989

[54] ELECTRIC SUPPLY DEVICE FOR AN OZONIZER

[75] Inventor: Jean F. Petitimbert, Beaumont-Sur-Oise, France

[73] Assignee: Trailigaz-Compagnie Generale De L'Ozone, France

[21] Appl. No.: 146,866

[22] Filed: Jan. 22, 1988

[30] Foreign Application Priority Data

Jan. 23, 1987 [FR] France ................. 87 00809

[51] Int. Cl.$^4$ ............................. H02M 7/00
[52] U.S. Cl. ......................... 363/36; 363/5;
363/64; 363/153; 361/235; 204/176; 422/186.16
[58] Field of Search .............. 363/3, 5, 9, 10, 64, 363/36, 39, 153, 154; 204/176; 361/235; 422/186.07, 186.15, 186.16

[56] References Cited

U.S. PATENT DOCUMENTS

| | | | |
|---|---|---|---|
| 3,431,483 | 3/1969 | Lafuze | 363/64 |
| 3,671,901 | 6/1972 | Lys | 363/154 |
| 4,680,686 | 7/1987 | Chapsal et al. | 363/64 |
| 4,695,939 | 9/1987 | Canay | 363/39 |

Primary Examiner—Peter S. Wong
Attorney, Agent, or Firm—Sughrue, Mion, Zinn, Macpeak & Seas

[57] ABSTRACT

Device for supplying power from a three-phase network to an ozonizer comprising at least two discharge elements (3, 4) having a capacitive character, and comprising two single-phase step-up transformers (1, 2) having air gaps connected in a SCOTT circuit and connected between the three-phase network and said discharge elements (3, 4). The device further comprises a three-phase transformer (8) whose secondary windings (5, 6, 7) are connected between said single-phase transformers (1, 2) and the three-phase network and whose primary windings (9, 10, 11) are star-connected and connected to the three-phase network through a dimmer (12).

3 Claims, 1 Drawing Sheet

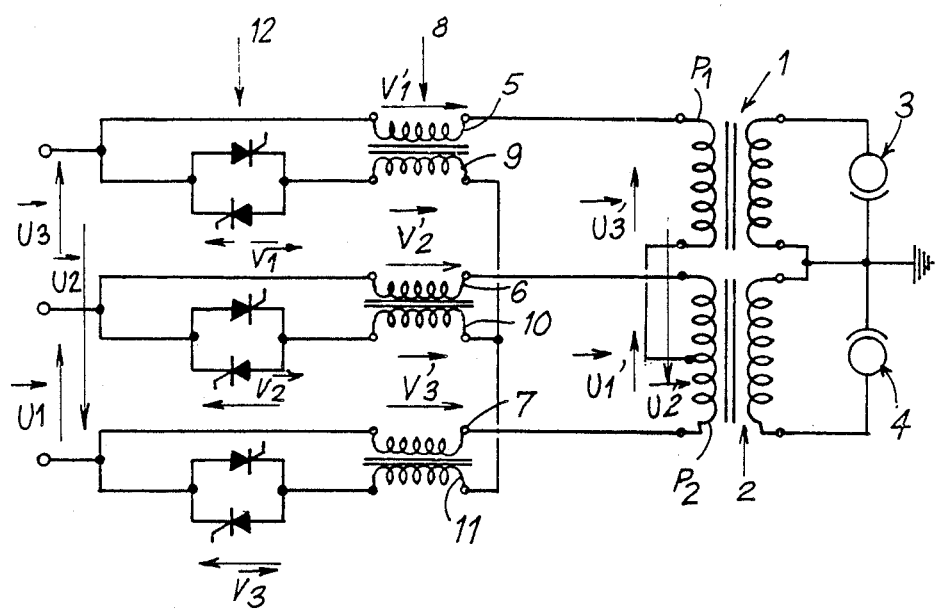

ELECTRIC SUPPLY DEVICE FOR AN OZONIZER

The present invention relates to ozone-producing apparatus or ozonizers and concerns more particularly electric supply devices for these apparatus.

The ozone is obtained in large quantities by subjecting the air or oxygen to an electric discharge at a pressure slightly higher than atmospheric pressure. An ionization then occurs by shocks between oxygen molecules resulting in the formation of ozone in accordance with the formula:

$$3O_2 \rightleftarrows 2O_3 - 2 \times 34000 \text{ cal.}$$

Ozone is an excellent oxidizing agent employed in many fields and in particular in the treatment of drinking water.

The basic cell of an ozonizer comprises a capacitor whose dielectric is composed of an air gap or an oxygen gap in series with an insulating substance usually constituted by glass. Industrial ozonizers are usually formed by groups of a plurality of basic cells connected in parallel between supply terminals connected to an alternating voltage generator.

By applying an alternating voltage between the two electrodes of the basic cell, there is created at the terminals of the air gap a potential difference and consequently an electric field.

If the peak value of the voltage applied is lower than the initiating voltage of the air or oxygen, the ozonizer behaves as two capacitors connected in series, namely an air capacitor and a glass capacitor.

On the other hand, if the peak value of the applied voltage is higher than the initiating voltage, glow discharges are produced in the air which then becomes partly conductive.

The active power consumed by the ozonizer is given by Manley's formula:

$$P = 4fC_v U_o (U_m - U_o \cdot C_a / C_t)$$

in which
$U_o$ represents the initiating voltage;
$U_m$, the maximum voltage at the terminals of the ozonizer;
$C_a$, the capacitance of the air capacitor;
$C_v$, the capacitance of the glass capacitor;
$C_t$, the total capacitance which is equal to $$\frac{C_a \cdot C_v}{C_a + C_v};$$

and
f, the frequency of the supply voltage.

For a given frequency, the maximum of the power will be obtained for $dP/dU_o = 0$.

$$P = K_1 U_o (U_m - U_o K_2) = -K_1 K_2 U_o^2 + K_1 U_o U_m$$

$$\frac{dP}{dU_o} = -2 K_1 K_2 U_o + K_1 U_m$$

$$\frac{dP}{dU_o} = 0 \text{ when } K_1 U_m = 2 K_1 K_2 U_o, \text{ namely } U_m = 2 K_2 U_o$$

$$K_2 = \frac{C_a}{C_t} = \frac{C_a(C_a + C_v)}{C_a C_v} = \frac{C_a + C_v}{C_v}$$

now

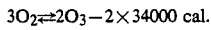

$\rightarrow$ P will therefore be maximum for $U_m = 2U_o$

There is already known from E.P.A. No. 0 186598 in the name of the applicant, a device for supplying from a three-phase network work an ozonizer comprising at least two discharge elements having a capacitive character, this device comprising two single-phase step-up transformers having an air gap, connected in a SCOTT circuit and connected between the three-phase network and said discharge elements.

A dimmer having thyristors of known type is connected between the network supply and the transformers. This dimmer operates by chopping the wave from the zero value of the voltage up to the value $U_m$. The apparent power dimensioning of this dimmer is therefore:

$$S = UI\sqrt{3}$$

Moreover, the inverse voltage carried by the thyristors is equal to peak 2U, namely $2U\sqrt{2}$ and therefore roughly 3U eff.

This device has a certain number of drawbacks, in particular as concerns the dimensioning of this dimmer and in particular the thyristors whose price depends a lot on the inverted voltage that they must be capable of carrying.

An object of the invention is therefore to solve these problems by proposing a device which is simple, reliable and of relatively low cost.

The invention therefore provides a device for supplying from a three-phase network an ozonizer comprising at least two discharge elements having a capacitive character, said device comprising two single-phase step-up transformers having air gaps connected in a SCOTT circuit and connected between the three-phase network and said discharge elements, said device further comprising a three-phase transformer whose secondary windings are connected between said single-phase transformers and the three-phase supply and whose primary windings are star-connected and connected to the three-phase network through a dimmer.

In another aspect, the invention also provides an ozonizer equipped with such a supply device.

A better understanding of the invention will be had from the following description which is given solely by way of example with reference to the accompanying drawings which shows an electric diagram of a supply device according to the invention.

This device essentially comprises two single-phase step-up transformers 1 and 2 having air gaps, which are connected to a three-phase network supply and to discharge elements 3 and 4 in a SCOTT circuit. The primary winding P2 of the transformer 2 is connected by its two terminals to two different phases of the network and its mid-point is connected to a terminal of the primary winding P1 of the transformer 1. The other terminal of the primary winding P1 of this transformer is connected to the third phase of the network.

Connected in each series in each of the phases of the network supply is a secondary winding respectively 5, 6 and 7, of a three-phase transformer whose primary windings 9, 10 and 11 are star-connected and connected to the network supply through a conventional wave-chopping dimmer 12.

This three-phase dimmer permits obtaining a variation in the supply voltage of the primary winding of the three-phase transformer. Thus, the maximum voltage at the terminals of the thyristors of the dimmer does not exceed the single voltage of the network supply, namely $U/\sqrt{3}$.

Advantageously, the transformer ratio of this three-phase transformer is roughly equal to 0.5. As the secondary windings of this transformer are connected in series in the supply circuit of the SCOTT circuit coupled to the ozonizer, it therefore varies the voltage at the terminals of the primary winding of the SCOTT circuit from U/2 to U.

The equations of the operation of such a device are the following:

$$\vec{U'_1} = \vec{U_1} + \vec{V_2} - \vec{V_3} = \vec{U_1} - m(\vec{V_2} - \vec{V_3})$$

$$\vec{U'_1} = \vec{U_2} + \vec{V_3} - \vec{V_1} = \vec{U_2} - m(\vec{V_3} - \vec{V_1})$$

$$\vec{U'_3} = \vec{U_3} + \vec{V_1} - \vec{V_2} = \vec{U_3} - m(\vec{V_1} - \vec{V_2})$$

now, $$\vec{V_1} - \vec{V_2} = \vec{U_3} \; ; \; \vec{V_2} - \vec{V_3} = \vec{U_1} \; ; \; \vec{V_3} - \vec{V_1} = \vec{U_2}$$

whence $$\vec{U'_1} = \vec{U_1}(1-m)$$

$$\vec{U'_2} = \vec{U_2}(1-m)$$

$$\vec{U'_3} = \vec{U_3}(1-m)$$

The power is minimum in such a device when the thyristors are on and:

$$U'_1 = \frac{U_1}{2} \; U'_2 = \frac{U_2}{2} \; U'_3 = \frac{U_3}{2}$$

Indeed, for these values at the terminals of the primary windings of the single-phase transformers, the ozonizer has a voltage $U_o = U/2$ and consequently the value for initiating the ozonizer.

The power will be maximum when the thyristors are off i.e., when no current passes therethrough. This gives:

$$U'_3 = U_3 \; U'_2 = U_2 \text{ and } U'_1 = U_1$$

As the transformer ratio of the transformer is roughly equal to 0.5, the primary current J in the three-phase transformer will be:

$$J = \tfrac{1}{2}I$$

and the apparent power S of this transformer will be:

$$S = 3 \; V \; J = 3 \; V'I$$

As this current J also passes through each branch of the dimmer, the apparent power of the latter is:

$$S' = 3VJ = U/\sqrt{3} \times I/2 \times 3$$

whence $S = \tfrac{1}{2}U \; I\sqrt{3}$, which corresponds to an apparent power equal to one-half of that required in the preceding circuit.

The inverse voltage at the terminals of the thyristors will be equal to 3 V, namely $U\sqrt{3}$.

This device operates in the opposite way to the preceding circuit, the harmonic rate is as low as the power is high. The inductance pertaining to the secondary winding of the three-phase transformer filters the harmonics created by the ozonizer. The leakage inductance and the primary inductance limit the deformation due to the angle of opening of the thyristors.

Furthermore, the principal compensation of the reactive energy of the ozonizer is always obtained by the magnetizing current of the SCOTT circuit (opening of the air gaps in the magnetic circuits).

Lastly, as the current passing through the thyristors is nil when the power is maximum, the efficiency of the thyristors is therefore equal to 1, which improves the efficiency of the assembly.

I claim:

1. A device for supplying from a three-phase network an ozonizer comprising at least two discharge elements having a capacitive character, said device comprising two single-phase step-up transformers having secondary windings, primary windings and air gaps connected in a SCOTT circuit and connected between the three-phase network and said discharge elements, said device further comprising a three-phase transformer having primary windings and secondary windings, the secondary windings of the three-phase transformer being connected between said single phase transformers and the three-phase network and the primary windings of the three-phase transformer being star-connected and a dimmer connects each of the primary windings of the three-phase transformer to the three-phase network.

2. A device according to claim 1, wherein the transformer ratio of the three-phase transformer is substantially equal to 1:2.

3. An ozonizer having at least two discharge elements and combined with a supply device for supplying power to the ozonizer, said device comprising two single-phase step-up transformers having secondary windings, primary windings and air gaps connected in a SCOTT circuit and connected between a three-phase network and said discharge elements, said device further comprising a three-phase transformer having primary windings and secondary windings, the secondary windings of the three-phase transformer being connected between said single-phase transformers and the three-phase network and the primary windings of the three-phase transformer being star-connected and a dimmer connects each of the primary winding of the three-phase transformer to the three-phase network.

* * * * *